United States Patent Office 3,497,708
Patented Feb. 24, 1970

3,497,708
CONTROL CIRCUIT RESPONSIVE TO VEHICLE SPEED
Roland H. Daugherty, Minneapolis, Minn., assignor to Millard W. Axelrod, St. Paul Park, Minn.
Filed Oct. 24, 1967, Ser. No. 677,604
Int. Cl. H02j 1/00, 3/00
U.S. Cl. 307—10                     9 Claims

ABSTRACT OF THE DISCLOSURE

A circuit is provided to control the operation of automobile headlights and tail lights or accessory equipment. Two modes of operation are possible and a manually operable switch is located in the vicinity of the vehicle operator for selecting the desired mode of operation. The equipment is energized through a switching device. In the circuit, power to energize the switching device comes from the accessory side of the ignition switch so neither mode is operable unless the ignition is on. In one mode of operation, the switching device responds directly to the on and off condition of the ignition switch so the equipment is energized when the ignition switch is closed and the engine is started. In the other mode of operation, a speed-calibrated variable resistance is adjusted to set the response of the switching device to the speed of the vehicle so it will turn on as the vehicle approaches a certain speed setting and off when the speed begins to fall below the preset value.

BACKGROUND OF THE INVENTION

Field of the invention

This invention is in the general field of control circuits for equipment in vehicles such as automobiles and is more specifically directed toward the field of automatic control and warning of the energization of equipment in a vehicle according to the speed of the vehicle.

Description of the prior art

A variety of circuits for controlling the operation of certain equipment in automobiles, such as the head and tail lights and accessories, have been developed but most of these are quite complicated or have been used to change the degree of operation such as increasing the brilliance of the light with speed. In some cases these circuits automatically turn on the equipment at certain speeds but do not turn it off. Furthermore, these prior art circuits have not been suitable for different modes of operation that the user might desire.

SUMMARY

Energy to activate the circuit for the equipment is fed to the circuit through electrical impedance means from a conventional energy source, such as the automobile battery or generator. Change of the impedance means from low to high conductivity can be manually set to occur automatically with the speed of the automobile or with the on and off operation of the ignition switch. This system is attached to the conventional equipment-control circuit without interfering with the usual manual on-off system generally found in most circuits. Manually operable switches and knobs along with the circuit components are packaged in a compact unit conveniently located adjacent the operator and the circuit is constructed with components which are rugged enough to stand up under the rigors of automobile travel. A speed-calibrated adjustable variable resistance provides the means for setting the velocity at which the equipment is energized.

BRIEF DESCRIPTION OF THE DRAWING

The features and advantages of this invention will become apparent during the course of the following detailed description, with reference to the accompanying drawing in which.

DESCRIPTION OF THE PREFERRED EMBODIMENT

Figure 1:
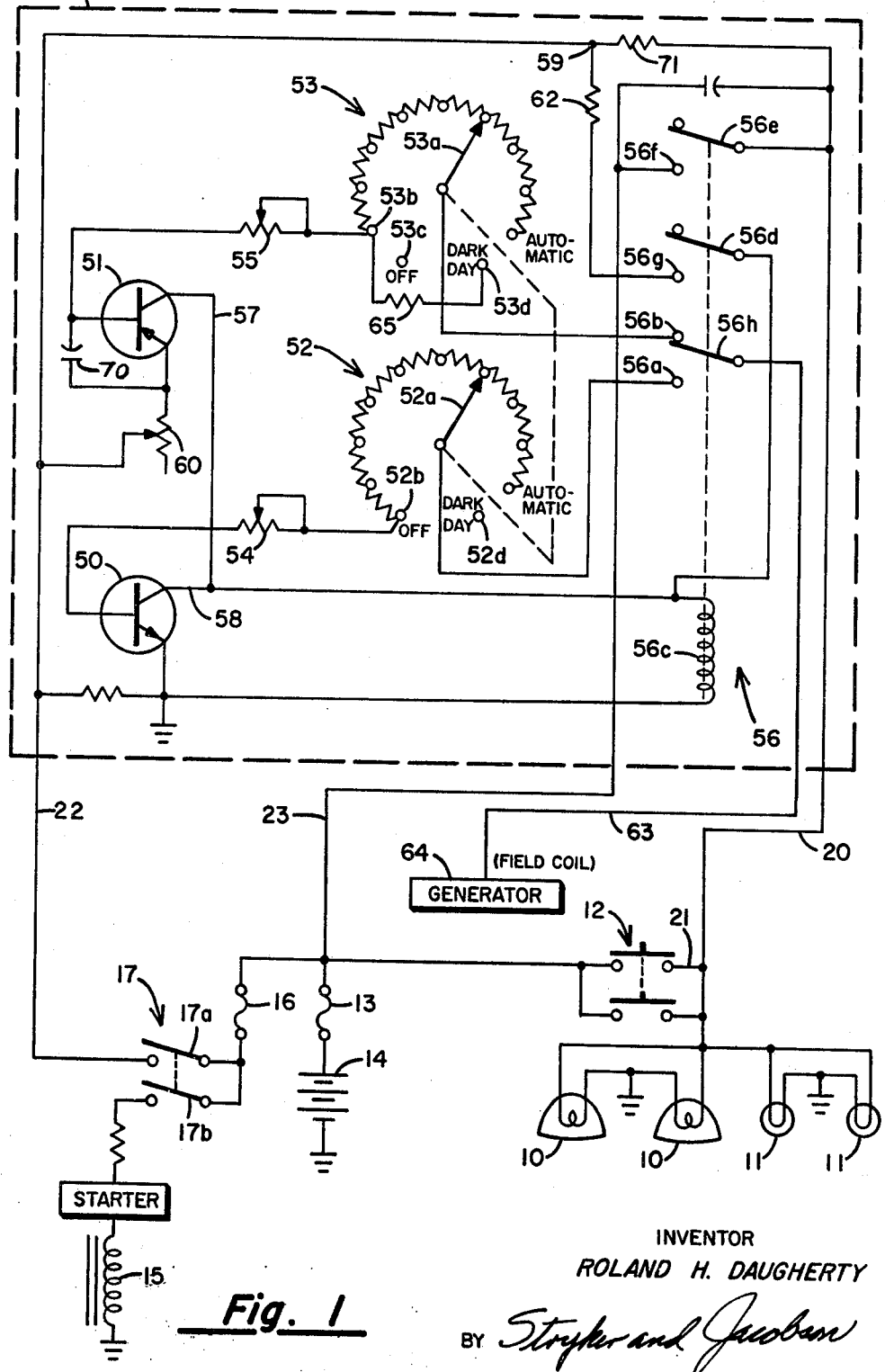
FIG. 1 is a schematic illustration of a preferred embodiment of this invention showing the automatic control circuit electrically connected to the headlight and tail light circuits in an automobile.

Referring now to the schematic illustration of the preferred embodiment of the invention as shown in FIG. 1, headlights 10 and tail lights 11 are electrically connected in the usual fashion through a manually operable on-off switch 12 and fuse 13 to battery 14. Likewise ignition coil 15 is connected in the usual fashion to battery 14 through ignition switch 17, fuse 16 and fuse 13. The ignition switch has two sections, 17a and 17b, for directing power to accessories and the ignition coil 15, respectively. In addition to being energized directly from battery 14 when switch 12 is closed, the head and tail lights will be energized when conductors 20 and 21 are active. Battery 14 provides power to conductor 23 through fuse 13 and, when ignition switch 17 is closed to conductor 22 through fuses 13 and 16 and contact 17a.

The circuit contains an NPN transistor 50, sometimes referred to as the "off" transistor, and a PNP transistor 51, sometimes referred to as the "on" transistor. Associated with each of these transistors are potentiometers 52 and 53 which have their respective variable taps or arms 52a and 53a ganged together on a common shaft so that they rotate in unison. The choice of values for the resistance in potentiometers 52 and 53 is related to the type of energy source with which they work and will be later described in greater detail. The base element of transistor 50 is connected through resistor 54 to terminal 52b at one end of the potentiometer 52 and the base element of transistor 51 is connected through resistor 55 to a corresponding terminal 53b on potentiometer 53. Variable arm 52a is electrically connected to normally open contact 56a of relay 56 and the variable arm 53a is electrically connected to normally closed contact 56b. One terminal of relay coil 56c is connected in parallel to the collector of transistor 51 through conductor 57, to the collector of transistor 50 via conductor 58 and to relay arm 56d. The other terminal of the relay coil 56c is connected to circuit ground. The emitter of transistor 50 is also connected to circuit ground and the emitter of transistor 51 is connected to terminal 59 through a variable resistor 60. The purpose of the latter will be described later. Terminal 59 is connected directly to conductor 22 and to ignition switch contact 17a. Relay contact arm 56e is connected directly to conductors 20 and 21 and normally open contact 56f is connected to conductor 23. Normally open contact 56g is connected through resistor 62 to terminal 59. Relay arm 56h is connected by conductor 63 back to the field coil of a generator 64 located at the automobile engine.

The ganged potentiometers 52 and 53 have three positions for three modes of operation. In the first of "System Off" mode, arm 52a is positioned at terminal 52b and arm 53a is positioned at terminal 53c. In the second or "Dark Day" mode, arm 52a is located at terminal 52d and arm 53a is positioned at terminal 53d. During the third or "Automatic Operation" mode the arms of the respective potentiometers can be selectively set to any of the taps on their respective resistance banks.

Investigation has revealed that the energy level measurable at the field coil of the generator is a fairly accurate reflection of the speed of the engine. Except for momentary occasions, the engine speed ordinarily reflects the speed of the automobile so that the field coil constitutes a convenient place to obtain an energy indication of automobile speed for use in this invention. However, it has been found that the energy level of the field coil has some unusual characteristics. Therefore it was found necessary to design potentiometers 52 and 53 so that the profiles of their respective resistor banks correspond to the energy level variations at the generator field coil. In general, it was found that the DC voltage from generator field to ground decreased in a nonlinear manner with an increase in engine speed and the DC voltage differential between the field and the battery positive increased in a nonlinear manner with increase in engine speed. By relating the engine speed to the automobile velocity and correspondingly determining the DC potential difference for various points along the speed curve, the resistance values for the resistance banks in the respective potentiometers were determined and were calibrated to automobile speed so that the knob can be set to the desired speed to adjust the potentiometer settings accordingly.

Considering first the "System Off" mode of operation, the "on" transistor 51 is off because its base element is floating since arm 53a is connected to the open terminal 53c. The base element of the "off" transistor 50 is connected through arm 52a of potentiometer 52 to the normally open contact 56a so it will likewise be in a floating condition. However, in the event the relay coil 56c should falsely energize, relay arm 56h would make contact with 56a so that potential would be applied to the base of transistor 50 causing it to conduct. In that event the collector-emitter circuit of transistor 50 would short out coil 56c since the collector is connected directly to the top terminal of coil 56c and the emitter is connetced directly to ground. This would de-energize the relay. Therefore, the only manner in which power can be applied to energize the head and tail lights would be through switch 12.

In the "Dark Day" mode of operation, the base element of "off" transistor 50 will be floating because arm 52a is at the open terminal 52d. This will effectively keep transistor 50 in the off condition. The base element of transistor 51 is connected through resistors 55 and 65, terminal 53d, arm 53a and through closed relay contact 56b to conductor 63 so that transistor 51 will energize as soon as there is any substantial output from the generator field. Resistors 55 and 65 in the base circuit are merely protective to limit the base current to prevent overdriving the transistor. When transistor 51 turns on it energizes relay coil 56c so that the lights are energized by battery power from conductor 23 through relay contact 56f and arm 56e. Concurrently, relay arm 56d makes contact with normally open contact 56g which then applies power from battery 14 through ignition switch contacts 17a and conductor 22 to relay coil 56c locking it in the energized condition. The lights will then remain energized independent of the speed of the automobile and will only go off when the ignition switch is opened.

In the "Automatic" mode of operation, the dial is manually set by the operator to the speed at which it is desired that the lights energize. This positions the movable arms 52a and 53a to corresponding positions on their respective resistor banks. While the automobile is traveling below the speed setting, the base of "off" transistor 50 is floating so it remains off and the base of "on" transistor 51 is insufficiently negative to fire. With increase in speed the field voltage on conductor 63 decreases to a point where the energy applied through relay contact 56b and arm 53a through the resistor bank is sufficient to fire transistor 51 so that it conducts. The circuit then operates in the same manner as it does when active in the "Dark Day" mode, with the lights being energized through relay contact 56f and arm 56e and the relay being locked in the energized condition through contact 56g and arm 56d. However, relay arm 56h contacting 56a now puts the generator field energy on conductor 63 on arm 52a so that the base of transistor 50 is no longer floating. When the automobile speed falls sufficiently below the dial setting, the energy from the generator field fires the transistor 50 so that it conducts. Since the collector-emitter circuit of transistor 50 is directly across relay coil 56c, heavy conduction in this circuit effectively shorts out the coil so the relay de-energizes and the contacts return to their normal condition. This places both transistors back in their original "off" condition and removes the power from the lights so that they turn off. Ordinarily there is approximately a 10% to 30% differential between the speed setting for firing transistor 51 and that at which transistor 50 operates when the speed drops off which provides sufficient hysteresis to eliminate the area of indecision where the circuit could otherwise oscillate between the on and off conditions.

Capacitor 70 connected between the collector and the emitter of transistor 51 acts as a momentary storage capacitor. During the instant in which the relay is first energized and power for holding the relay energized is being transferred from the collector-emitter circuit of transistor 51 to the self-locking circuit through the relay contacts, storage in capacitor 70 keeps transistor 51 conducting to prevent the relay coil 56c from de-energizing before it latches itself in the energized condition.

Variable resistor 60 merely provides a convenient means for making adjustment to compensate for differences among various automobile generators. It has been found that although all generators ordinarily have the same general characteristics, there are enough differences between generators to require some balancing adjustment which resistor 60 provides. Resistor 71 is in the circuit merely to protect the relay contact from burning due to excessive arcing if it opens. Other components in the circuit are not considered to constitute novel aspects of the invention and are merely included to provide proper loading, balancing and protection in the various modes of operation.

Figure 2:
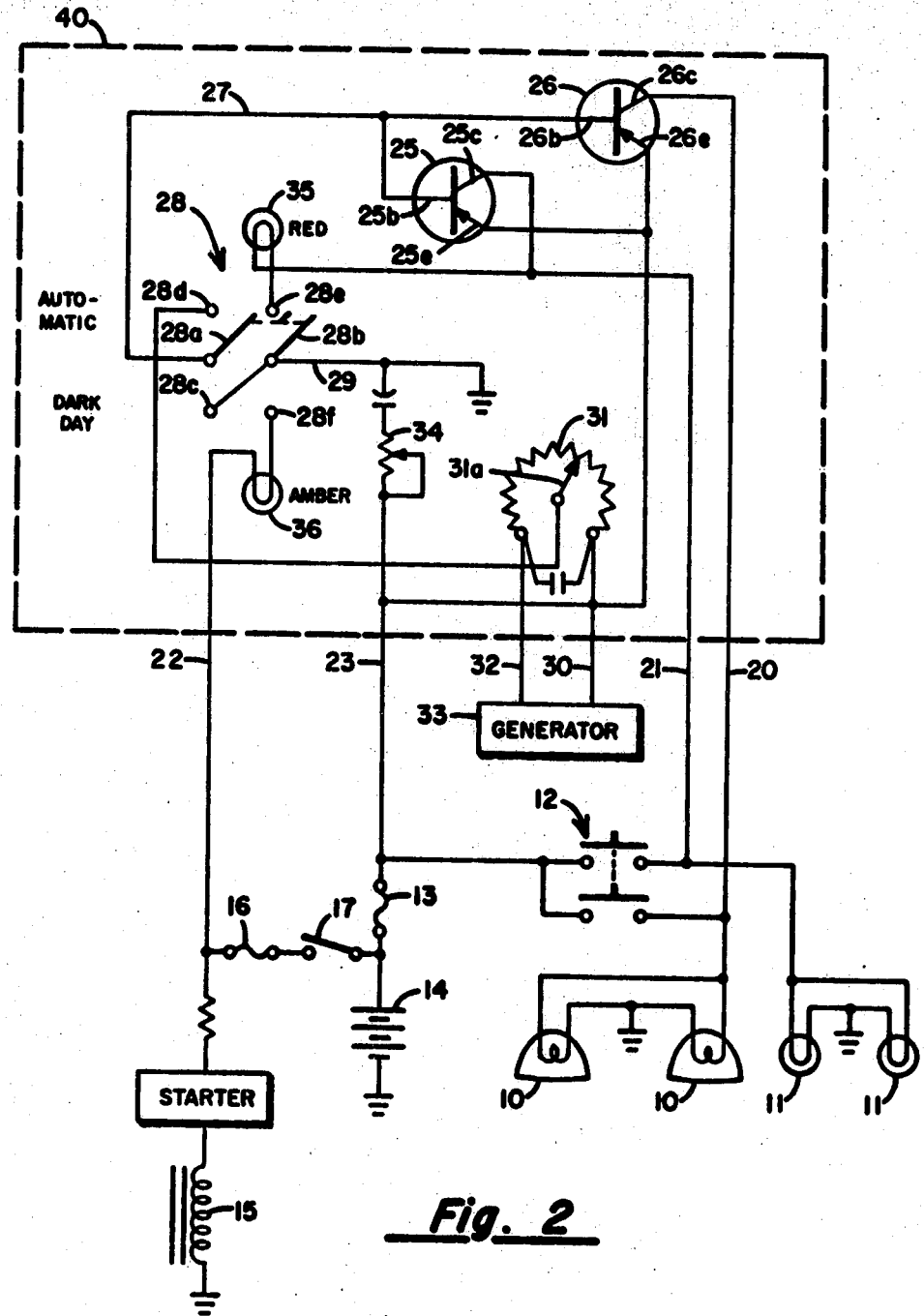
FIG. 2 is a schematic of another embodiment of this invention which, in the same manner as the circuit in FIG. 1, may be electrically connected to the ordinary headlight and tail light systems in an automobile.
Figure 3:
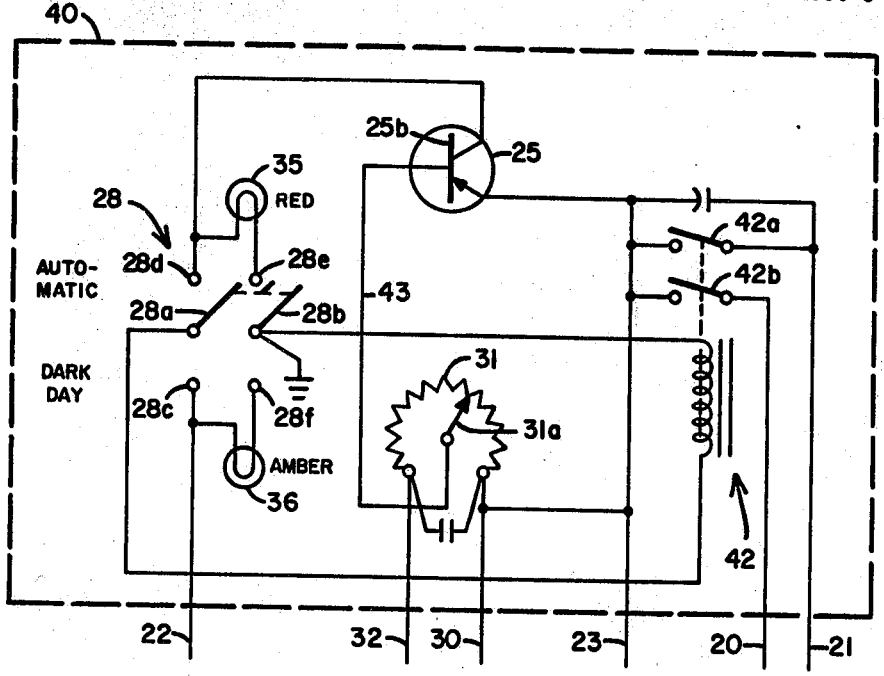
FIG. 3 is a schematic diagram of a variation of the circuit illustrated in FIG. 2.

Another embodiment of the invention is illustrated in schematic form in FIG. 2. In FIGS. 2 and 3 similar parts have the same reference numerals as in FIG. 1, headlights 10 and tail lights 11 are shown connected electrically in the usual fashion through a manually operable on-off switch 12 and fuse 13 to the battery 14. Similarly, ignition coil 15 is connected to battery 14 through fuse 16 and ignition switch 17. In addition to being energized directly from the battery 14 when switch 12 is closed, the headlights 10 can be operated by energy transmitted by conductor 20 and the tail lights can be operated by energy transmitted by conductor 21. Whenever the ignition switch 17 is closed, energy from battery 14 also appears on conductor 22 through fuse 16. Battery 14 also provides energy on conductor 23 through fuse 13.

A pair of PNP transistors 25 and 26 have their respective base electrodes, 25b and 26b, connected together and their respective emitter electrodes, 25e and 26e, connected together. The base elements are connected by conductor 27 to one pole, 28a, of a double-pole double-throw switch 28 which has its other pole, 28b, connected to a common electrical return path indicated by the usual ground symbol through conductor 29. The emitters of transistors 25 and 26 are connected back to input conductor 30. The collector electrode 26c is electrically connected to conductor 20 which is the line for energizing the headlights 10 and collector element 25c is connected to conductor 21 which energizes the tail lights 11.

An end terminal of potentiometer 31 is connected to conductor 30 and the other end of the potentiometer is connected to conductor 32. Conductors 30 and 32 are connected across a source of energy 33 whose output is directly proportional to the speed of the automobile. Energy source 33 can take a variety of forms, for example, a miniature DC generator attached to the speedometer cable or a device coupled in some convenient fashion to the engine to produce an output proportional to the engine speed which generally reflects the vehicle speed. The potential applied across potentiometer 31 will then vary in direct proportion to the velocity of the vehicle. A variable resistor 34 is connected between conductor 30 and ground and its function is merely to stabilize and provide a constant load on energy source 33. The center arm or variable tap 31a is connected to switch terminal 28d. Terminal 28e is connected to one side of a red-colored indicating lamp 35 whose other side is connected to collector 25c. Terminal 28c is electrically connected to pole 28b which will ground bases 25b and 26b when switch 28 is in the "Dark Day" position. An amber-colored indicating lamp 36 is connected between terminal 28f and conductor 22.

Figure 4:
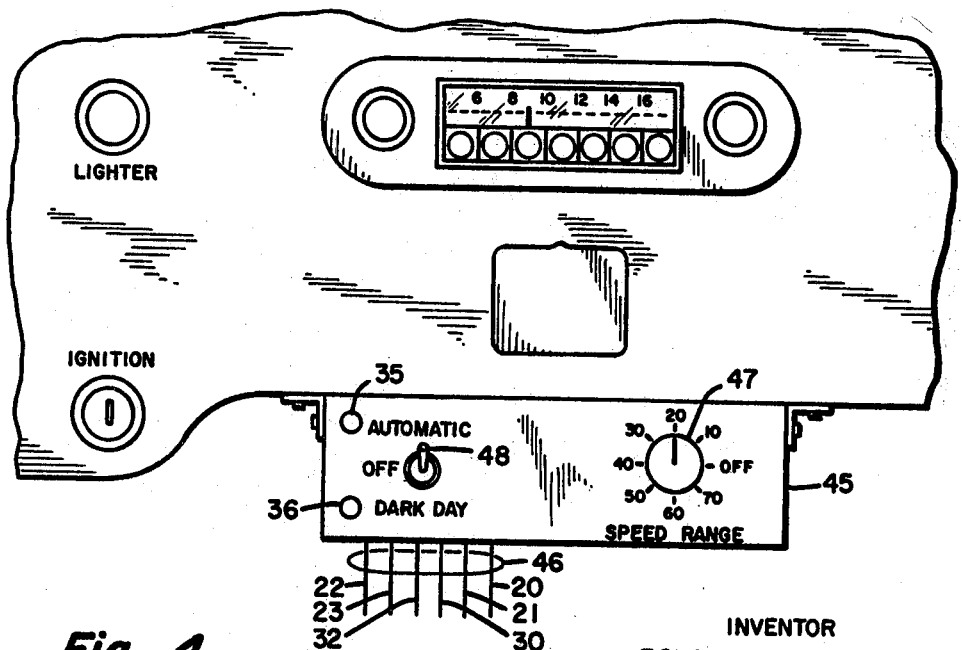
FIG. 4 illustrates the manner in which the invention can be packaged in a compact unit and conveniently located for operation and observation by the driver.

It can be visualized that all of the various circuit components including transistors, indicator lamps, potentiometers, switches, relays and the electrical connections therebetween can be assembled in a compact unit and placed in a convenient location and easily connected into the regular light circuit by a set of conductors which can be made up in cable form. Broken line 40 outlines a unit of this nature which would contain the various circuit components and electrical wiring. FIG. 4 illustrates a suitable rectangular container 45 in which the various components are mounted under the dashboard of an automobile and having cable 46 containing the outside wire connections attached thereto. Dial and knob assembly 47 for setting the movable arm of the potentiometer is calibrated in miles per hour. The knob, handle 48 for operating switch 28 and the colored indicating lamps 35 and 36, are conveniently accessible to the driver.

The operation of the circuit in FIG. 2 will now be described. Assuming the double-pole double-throw switch 28 is initially in the "Dark Day" position, when ignition switch 17 is closed by turning the key, power from battery 14 energizes amber-lamp 36 through conductor 22 and fuse 16. Concurrently bases 25b and 26b are grounded through pole 28a. Since the emitters are always connected to the battery 14 through conductor 23 and fuse 13, the energy levels and the transistor types are selected such that under these conditions the transistors will fire or conduct quite heavily in their respective emitter-collector circuits. The tail lights 11 will be energized via conductor 21 from transistor 25 and the headlights 10 will be energized by transistor 26 through conductor 20. The lights will remain in this condition throughout the "Dark Day" mode of operation while the ignition circuit is closed.

When switch 28 is thrown to the "Automatic" position, the base elements 25b and 26b are then connected to arm 31a so that the transistors wil start to conduct only when the energy levels tapped off by arm 31a is sufficient to reduce the impedance level to cause suitable and sufficient conduction in the respective oollector circuits. The arm 31a can be set to initiate firing of the transistors at any desired speed, within certain limits of course. When the automobile velocity is sufficiently great so that transistors 25 and 26 turn on and conduct quite heavily, the head and tail lights are energized by the respective collector circuits in the same manner as described earlier and red glow lamp 35 is energized. When the velocity of the automobile drops far enough below the speed setting, conduction through the transistors is no longer heavy enough to keep the lights glowing.

It can be seen that the various embodiments and their variations for selectively controlling the operation of the lighting system or other systems in a vehicle can be easily connected into the conventional system without interfering with normal system operation. For example, the embodiments described heretofore can be used for lighting circuit control without interfering with the ordinary means for turning the lights on and off such as with the dashboard switch 12. To provide for this, switch 28 would have a third or neutral position (not shown), corresponding to the "System Off" position in FIG. 1, in which the automatic control circuit would be disconnected from the system and control of the lights would be by operation of manual switch 12 in the usual fashion.

As stated earlier, energy source 33 which produces energy levels proportional to the speed of the automobile may take a variety of forms. It may be, for example, a small compact DC generator which is tied into the speedometer cable by a T connection. Or it may be a small energy-producing device coupled to the engine of the like to produce an output proportional to the engine speed. Other contemplated forms are devices which operate off the engine vacuum lines or the air ducts to obtain indications of velocity from which corresponding energy levels can be produced. Another contemplated velocity-sensing method uses a "strobe light" generator whose signals may be varied by the control-box impedance. The signal flash rates may be adjusted to synchronize with precalibrated tire surface velocity. A photoelectric cell would be used to sense the strobed signal and transmit it to the transistorized control circuit.

Turning now to FIG. 3 a further embodiment of this invention is shown. Components and wiring connections which are similar to those in FIGS. 1 and 2 are identified with the same reference numerals. The principal difference between the embodiment in FIG. 2 and that illustrated in FIG. 3 is that in the latter transistor 26 has been replaced by relay 42. Also it should be observed that the base element of transistor 25 is always connected to the movable potentiometer arm 31a by conductor 43. When switch 28 is in the "Dark Day" position, the amber light 36 is energized and the battery energy on line 22 is applied to the coil of relay 42 through pole 28a to energize the relay. The normally open relay contacts 42a and 42b are thereby closed so that conductor 23 from the battery is now connected through the closed relay contacts to conductors 20 and 21 which are respectively connected to the headlight and tail light energizing circuits so that the lights are energized when the ignition switch is closed. When switch 28 is flipped to the "Automatic" position, the coil of relay 42 is energized through the collector circuit of transistor 25. Only when the latter is on and conducting quite heavily, as controlled by the energy level appearing on the base element 25b from tap 31a, will the relay be energized. When the vehicle speed is great enough so that this occurs, relay contacts 42a and 42b again close to complete the circuit paths from the battery to the headlights and tail lights. In the same fashion as described with relation to FIG. 2, arm 31a can be positioned to whatever speed setting is desired. As earlier, when the relay is energized through transistor 25, red lamp 35 will glow to give the visual warning that the speed setting has been reached.

In all of the described embodiments, there is little danger of oscillatory action of the control circuits which would cause repeated flickering of the lights. Both the transistors and the relays ordinarily are characterized by having sufficient hysteresis so that there is a gap between their turn-on and turn-off levels. In other words, these components inherently operate so that the energy level must fall somewhat below the turn-on point before they will turn off and must rise somewhat above the turn-off before they will turn back on. Furthermore, because of the very nature of these components they are quite rugged in construction so they can easily withstand most, if not all, of the rigors which might be encountered in ordinary vehicular use. Compactness, accessibility, ease of adjustment, instant visual indications, and convenient location, are all additional features of the invention.

Although the embodiments of this invention have been described herein as used for controlling the operation of the light circuits, no limitation thereto is intended. It is contemplated that the operation of other circuits can be controlled in a similar manner with the attendant features and advantages.

I claim:

1. Apparatus for controlling the energization of electrical equipment in a vehicle, comprising:
   (a) variable electrical impedance means having control means, said impedance means being operatively set to a low impedance level by said control means only when electrical energy applied to said control means is at least a predetermined level and being at a high impedance level when the energy applied to said control means is below said predetermined level;
   (b) generator means attached to the vehicle for producing electrical energy at levels which vary with the vehicle speed;
   (c) a source of energy of a substantially fixed magnitude located within the vehicle;
   (d) first conducting means for electrically coupling said energy source to the vehicle equipment through said variable impedance means for energizing said equipment when said variable impedance means is in the low impedance level;
   (e) switch means for selectively electrically coupling said variable impedance control means to said generator means;
   (f) means electrically coupled to said generator means for selectively tapping off a portion of the output energy; and
   (g) means for connecting said tap means to said variable impedance control means.

2. The invention as in claim 1 further including: second conducting means for electrically coupling said fixed magnitude energy source to said variable impedance means when said impedance means is in the low impedance level.

3. The invention as in claim 2 wherein said second conducting means couples said energy source to said variable impedance means through the vehicle ignition switch.

4. The invention as in claim 1 wherein: said variable impedance means comprises transistor means having base electrode control means and a multiple-contact relay having a control coil; said tap means being connected to the base electrode; said first conducting means electrically connecting said energy source to the vehicle equipment through a normally open contact on said relay; and the collector-emitter circuit of said transistor means being electrically connected to said relay control coil for energizing same when the tapped-off portion of the generator output energy applied to said base electrode causes said transistor means to conduct.

5. The invention as in claim 4 further including means for electrically coupling said base electrode to said generator means through a normally closed contact on said relay.

6. The invention as in claim 5 including: second transistor means having a base electrode control means; means for electrically connecting said second transistor base electrode to said generator means through a normally open contact of said relay; and means electrically connecting the emitter-collector circuit of said second transistor means to said relay coil for de-energizing said coil when said second transistor base electrode causes said second transistor means to conduct.

7. The invention as in claim 6 wherein said means for electrically coupling the base electrodes of both transistor means to the generator means through the respective relay contacts each contain respectively adjustable resistance means for selectively setting the energy level applied to the respective base electrodes.

8. The invention as in claim 7 further including a rigid casing located within the vehicle adjacent the vehicle operator for mounting said switch means, said tap means, said impedance means, said adjustable resistance means and the conducting means connected therebetween; and wire cabling removably attached to said casing for electrically connecting remotely located vehicle electrical equipment, said generator means and said energy source to said means mounted in said casing.

9. Apparatus for controlling the energization of electrical equipment in a vehicle, comprising:
   (a) variable electrical impedance means having control means, said impedance means being operatively set to a low impedance level by said control means only when electrical energy applied to said control means is at least a predetermined level and being at a high impedance level when the energy applied to said control means is below said predetermined level;
   (b) generator means attached to the vehicle for producing electrical energy at levels which vary with the vehicle speed;
   (c) a source of energy of a substantially fixed magnitude located within the vehicle;
   (d) first conducting means for electrically coupling said energy source to the vehicle equipment through said variable impedance means for energizing said equipment when said variable impedance means is in the low impedance level;
   (e) switch means for selectively electrically coupling said variable impedance control means to said generator means; and
   (f) manually operable adjustment means for selectively setting the level at which said control means will change the impedance level of said variable impedance means.

References Cited

UNITED STATES PATENTS

| 1,248,375 | 11/1917 | Morrison et al. | 315—79 X |
| 3,171,058 | 2/1965 | Ono | 315—79 X |
| 3,397,342 | 8/1968 | Dill | 315—79 |
| 3,402,321 | 9/1968 | Tagawa | 315—79 X |

ROBERT S. MACON, Primary Examiner

T. B. JOIKE, Assistant Examiner

U.S. Cl. X.R.

315—79, 83